Patented Aug. 11, 1925.

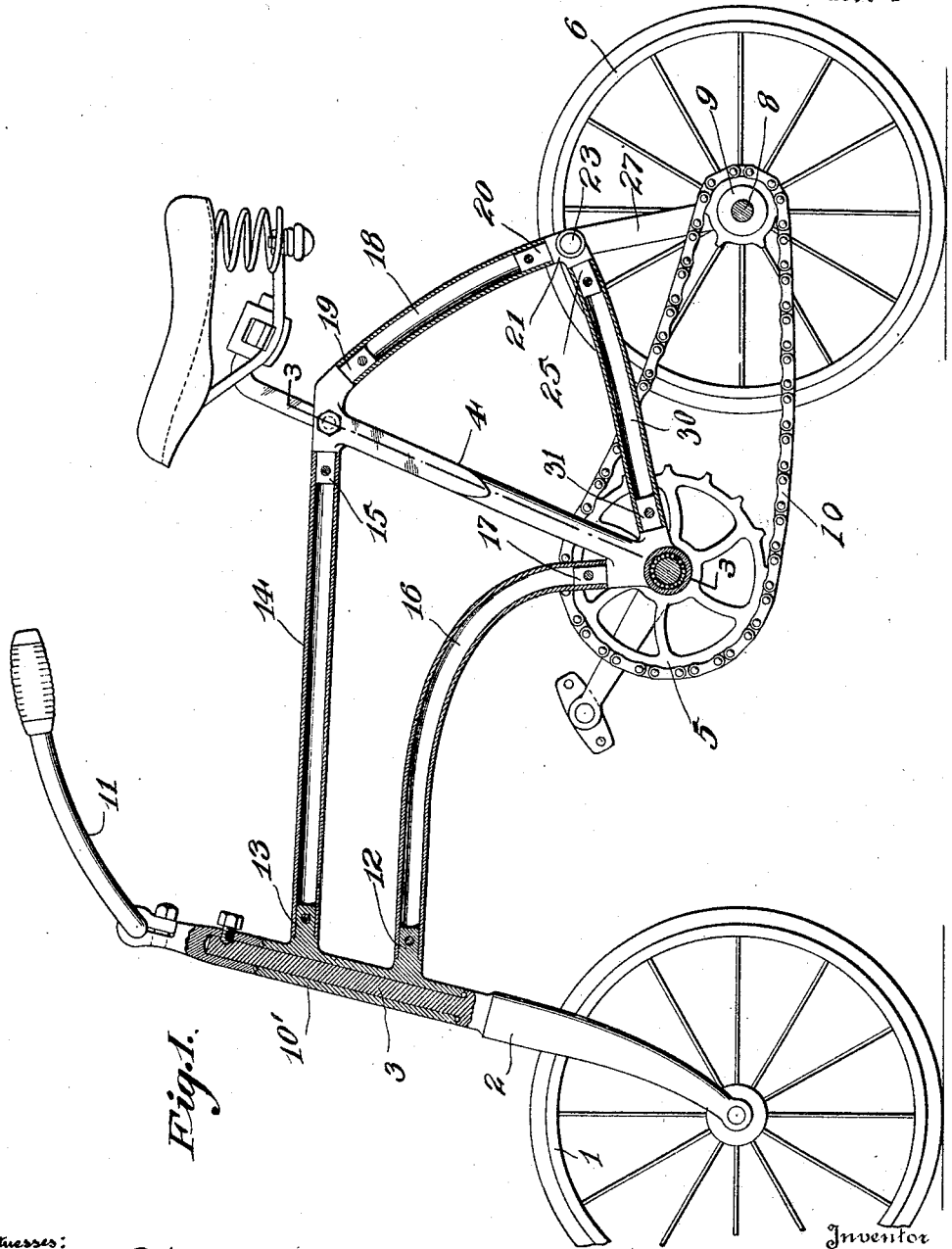

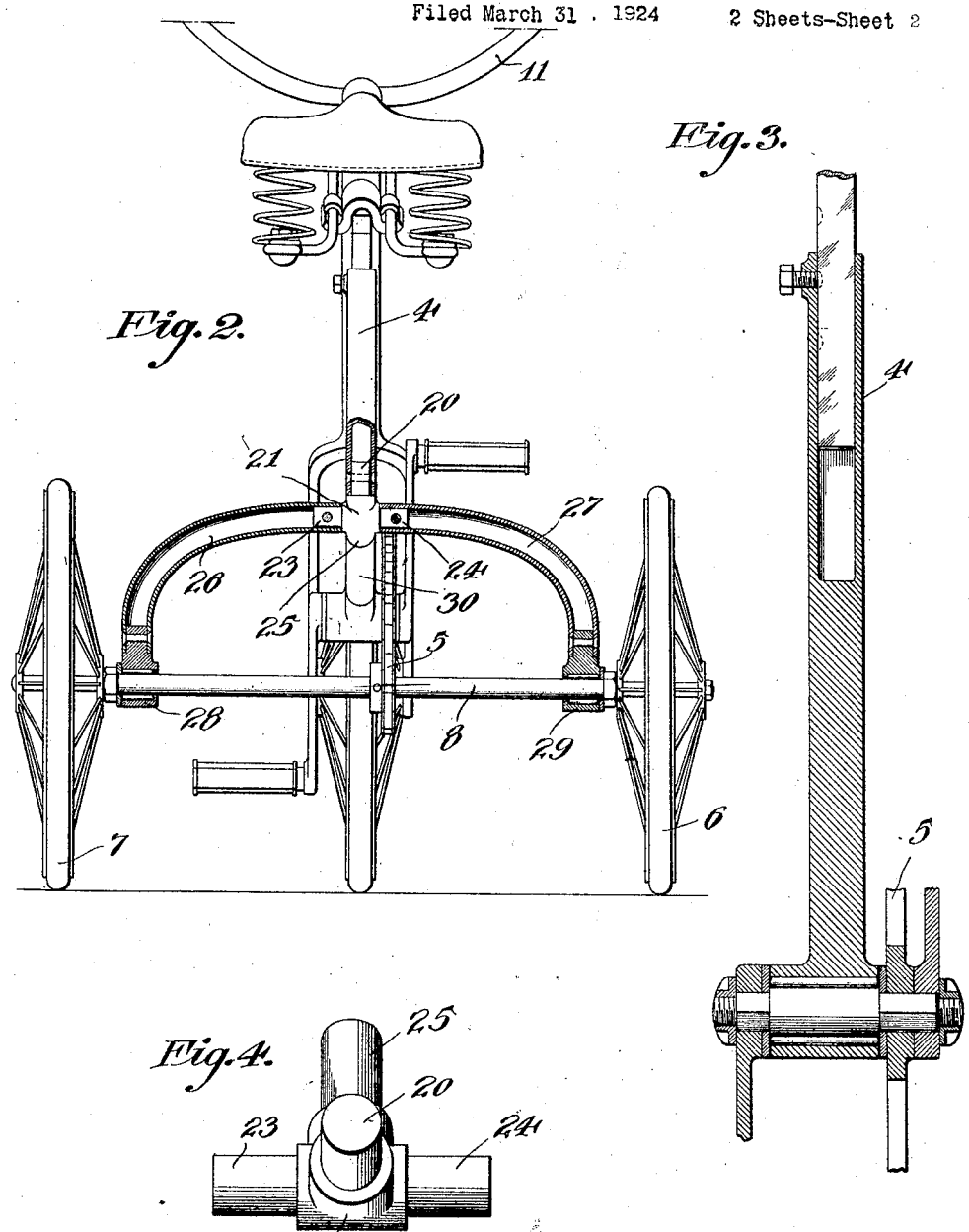

1,549,088

UNITED STATES PATENT OFFICE.

MARTIN KARPIUK, OF PHILADELPHIA, PENNSYLVANIA.

TRICYCLE.

Application filed March 31, 1924. Serial No. 703,023.

*To all whom it may concern:*

Be it known that I, MARTIN KARPIUK, a citizen of the United States, residing at Philadelphia, in the county of Philadelphia and State of Pennsylvania, have invented certain new and useful Improvements in Tricycles, of which the following is a specification.

My invention relates to tricycles and its object is to provide a tricycle of simple and durable construction which may be ridden at greater speed and with greater ease and comfort than is possible with tricycles of known types.

These objects, and other advantageous ends which will be described hereinafter, I attain in the following manner, reference being had to the accompanying drawings in which Figure 1 is central longitudinal section through a tricycle constructed in accordance with my invention, certain of the parts being shown in full, Figure 2 a rear view of the tricycle shown in Figure 1, certain of the parts being shown in section, Figure 3 an enlarged section taken on line 3—3 of Figure 1, and Figure 4 a plan view of an element which forms a part of my invention.

Referring to the drawings, 1 indicates the front wheel which is mounted in a front fork 2 carried by a steering post 3, 4 a saddle pillar, 5 a pedal actuated driving sprocket carried by the saddle pillar, 6 and 7 the rear wheels, which are mounted upon a shaft 8, 9 a sprocket fixed to the shaft and 10 a driving chain connecting sprockets 5 and 9. The frame includes a sleeve 10' embracing the steering post, carrying a handle bar 11 and provided with studs 12 and 13, an upper frame-tube 14 secured to stud 13 and to a stud 15 extending from the upper end of the saddle pillar, a frame-tube 16, serving as a front brace, secured to stud 12 and to a stud 17 extending from the lower part of the saddle pillar, a rear frame-tube 18 secured to a stud 19 projecting rearwardly from the upper part of the saddle pillar, and connected by a stud 20 with a union 21 which also carries two laterally projecting studs 23 and 24 and a forwardly projecting stud 25, yoke arms 26 and 27 are secured to studs 23 and 24 and are provided with bearings 28 and 29, preferably of the roller type, for shaft 8 upon which the rear wheels are mounted. A frame tube 30, serving as a rear brace, is secured to stud 25 and to a stud 31 extending rearwardly from the saddle pillar. One of the rear wheels is detachably fixed to shaft 8 by any suitable means and the other rear wheel is rotatably mounted on said shaft.

A tricycle as above set forth may be ridden at comparatively great speed because the propelling means are mounted in the frame in such position that the weight of the body, in addition to the strength of the limbs of the operator may be utilized for propelling, and the speed ratio between the sprocket 5 and wheel 6 is proportioned as in a bicycle so that great speed may be obtained by comparatively slow pedaling of sprocket 5.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A tricycle including a front frame and steering wheel; a saddle pillar connected to the front frame; a yoke carrying the rear ground wheels; a frame part connecting the saddle pillar directly with said yoke; and a brace having one end secured to said saddle pillar and the other end secured to said yoke close to the junction of said frame part with said yoke.

2. A tricycle including a front frame and steering wheel; a saddle pillar connected to the front frame; a union member provided with furcations carrying rear ground wheels; a frame part connecting the saddle pillar directly with said union member; and a brace having one end secured to said saddle pillar and the other end secured to said union member.

3. A tricycle including steering means; a front wheel rotatable therein; a saddle pillar; a driving member carried by the pillar; a rear frame member extending from the upper part of the pillar; a union fixed to said member and carrying furcations; a brace member extending from the lower part of the saddle pillar to the union;

a shaft carried by the furcations; a rear wheel fixed to the shaft; a rear wheel rotatable on the shaft; a driven member fixed to the shaft, and means operatively connecting the driving member with the driven member.

4. A tricycle including steering means; a front wheel rotatable therein; a saddle pillar; a pedal operated driving sprocket carried by the pillar; a rear frame member extending from the upper part of the pillar; a union fixed to said member and carrying furcations; a brace member extending from the lower part of the saddle pillar to the union member; a shaft carried by the furcations; a rear wheel fixed to the shaft; a rear wheel rotatable on the shaft; a sprocket fixed to the shaft, and a chain operatively connecting said sprocket with the driving sprocket.

In testimony whereof I have signed my name to this specification in the presence of two subscribing witnesses.

MARTIN KARPIUK.

Witnesses:
KOSIMIERZ GLOWACKI,
CHAS. E. POTTS.